United States Patent
Chen

(10) Patent No.: US 9,459,172 B2
(45) Date of Patent: Oct. 4, 2016

(54) DIAPHRAGM PIEZORESISTIVE PRESSURE SENSOR

(71) Applicant: Asia Pacific Microsystems, Inc., Hsinchu (TW)

(72) Inventor: Ming-Yan Chen, Hsinchu (TW)

(73) Assignee: ASIA PACIFIC MICROSYSTEMS, INC., Hsinchu (TW)

( * ) Notice: Subject to any disclaimer, the term of this patent is extended or adjusted under 35 U.S.C. 154(b) by 118 days.

(21) Appl. No.: 14/520,550

(22) Filed: Oct. 22, 2014

(65) Prior Publication Data

US 2015/0114129 A1 Apr. 30, 2015

(30) Foreign Application Priority Data

Oct. 24, 2013 (TW) .............................. 102138472 A

(51) Int. Cl.
*G01L 9/06* (2006.01)
*G01L 19/06* (2006.01)
*G01L 9/00* (2006.01)

(52) U.S. Cl.
CPC ......... *G01L 19/0618* (2013.01); *G01L 9/0052* (2013.01); *G01L 9/0054* (2013.01); *G01L 9/0055* (2013.01)

(58) Field of Classification Search
None
See application file for complete search history.

(56) References Cited

U.S. PATENT DOCUMENTS

| 4,881,056 A * | 11/1989 | Mizukoshi ............ G01L 9/0042 338/4 |
| 5,220,838 A * | 6/1993 | Fung ..................... G01L 9/0042 29/621.1 |
| 7,383,737 B1 * | 6/2008 | Lin ........................ G01L 9/0072 73/718 |
| 8,171,800 B1 * | 5/2012 | Chiou .................... G01L 9/0052 73/716 |
| 2008/0308920 A1 * | 12/2008 | Wan ..................... B81C 1/00095 257/685 |
| 2013/0087863 A1 * | 4/2013 | Chiou .................... G01L 9/0052 257/417 |
| 2013/0214370 A1 * | 8/2013 | Hussain ................ G01L 9/0055 257/420 |
| 2014/0319628 A1 * | 10/2014 | Nakane ................... H01L 23/10 257/415 |
| 2015/0090043 A1 * | 4/2015 | Ruhl ........................ G01N 3/02 73/777 |
| 2015/0122042 A1 * | 5/2015 | Lin ......................... B23P 19/04 73/754 |

* cited by examiner

*Primary Examiner* — Andre Allen
(74) *Attorney, Agent, or Firm* — Chen-Chi Lin

(57) ABSTRACT

A diaphragm piezoresistive pressure sensor includes: a base member; a diaphragm including a middle portion and a surrounding portion surrounding the middle portion; a spacer disposed between and cooperating with the base member and the diaphragm to define a cavity thereamong; an inner abutment member disposed in the cavity and spaced apart from the base member by a clearance; and a piezoresistive sensor unit embedded in the diaphragm. The spacer surrounds and is spaced apart from the inner abutment member. At least one of the inner abutment member and the middle portion of the diaphragm defines a chamber therebetween.

16 Claims, 6 Drawing Sheets

DIAPHRAGM PIEZORESISTIVE PRESSURE SENSOR

CROSS-REFERENCE TO RELATED APPLICATION

This application claims priority of Taiwanese Patent Application No. 102138472, filed on Oct. 24, 2013.

FIELD OF THE INVENTION

This invention relates to a diaphragm piezoresistive pressure sensor, more particularly to a diaphragm piezoresistive pressure sensor including a diaphragm that has middle and surrounding portions which overlap a chamber and a cavity, respectively.

DESCRIPTION OF THE RELATED ART

European Patent Application Publication No. 0 049 955 discloses a pressure sensor including a silicon chip that is mounted on a glass substrate and that has two cavities which are separated by a partitioning wall. The partitioning wall extends from and divides a diaphragm wall of the silicon chip into two diaphragm halves, and has a bottom mounting surface that is bonded to the glass substrate. One of the cavities is covered by one of the diaphragm halves and is opened to the outside of the silicon chip, while the other one is covered by the other of the diaphragm halves and is completely sealed by the glass substrate, the partitioning wall, the respective diaphragm half and a surrounding wall of the silicon chip. Two Wheatstone bridge circuits are embedded in the diaphragm halves, respectively. The cavities are aligned with each other along a transverse direction relative to a normal direction of the diaphragm. The sealed cavity may be used to measure the barometric pressure. The opened cavity may be used to measure the differential pressure between the atmosphere and a system, such as a manifold of an engine.

U.S. Pat. No. 7,856,885 discloses a multi-diaphragm piezoresistive pressure sensor that includes an inner deformable diaphragm formed on a silicon substrate and having a first thickness, an outer deformable diaphragm formed on the silicon substrate, surrounding the inner diaphragm, and having a second thickness greater than the first thickness, a first piezoresisitive bridge embedded in the inner diaphragm, and a second piezoresistive bridge embedded in the outer diaphragm. By using a thicker outer diaphragm as a reinforcement structure, sharp peak stresses at edges of the inner diaphragm can be avoided, which, in turn, improves the maximum operating pressure capability and opens the possibility for designing an inner diaphragm with a thickness much thinner than that of a conventional single diaphragm for achieving higher sensitivity.

The whole disclosures of European Patent Application Publication No. 0 049 995 and U.S. Pat. No. 7,856,885 are incorporated herein by reference.

SUMMARY OF THE INVENTION

An object of the present invention is to provide a diaphragm piezoresistive pressure sensor with a diaphragm having portions that can be used for measuring high and low pressure ranges, respectively.

According to this invention, there is provided a diaphragm piezoresistive pressure sensor that comprises: a base member; a diaphragm overlapping and spaced apart from the base member along a normal direction relative to the diaphragm, the diaphragm being deformable toward the base member and including a middle portion and a surrounding portion surrounding the middle portion; a spacer disposed between and cooperating with the base member and the diaphragm to define a cavity thereamong, the diaphragm overlapping an entire area of the cavity along the normal direction; an inner abutment member disposed in the cavity and spaced apart from the base member along the normal direction by a clearance, the inner abutment member being secured to the diaphragm so as to be movable with the diaphragm relative to the base member; and a piezoresistive sensor unit embedded in the surrounding portion and the middle portion of the diaphragm. The spacer surrounds and is spaced apart from the inner abutment member. At least one of the inner abutment member and the middle portion of the diaphragm defines a chamber therebetween. The piezoresistive sensor unit is configured to measure pressures at least in two different pressure ranges corresponding to the cavity and the chamber, respectively.

BRIEF DESCRIPTION OF THE DRAWINGS

In drawings which illustrate embodiments of the invention.

DETAILED DESCRIPTION OF THE EMBODIMENTS

Figure 1:
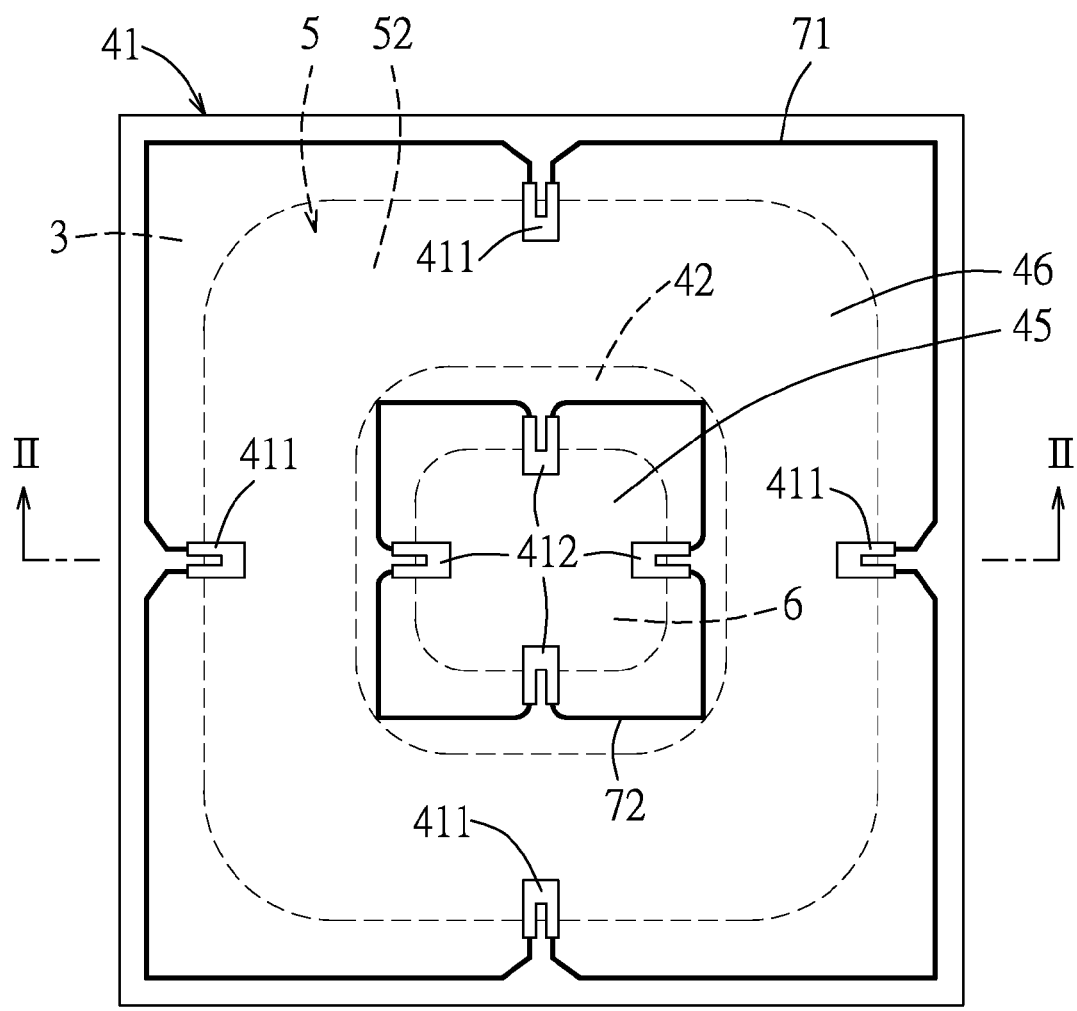
FIG. 1 is a schematic view of the first embodiment of a diaphragm piezoresistive pressure sensor according to the present invention.
Figure 2:
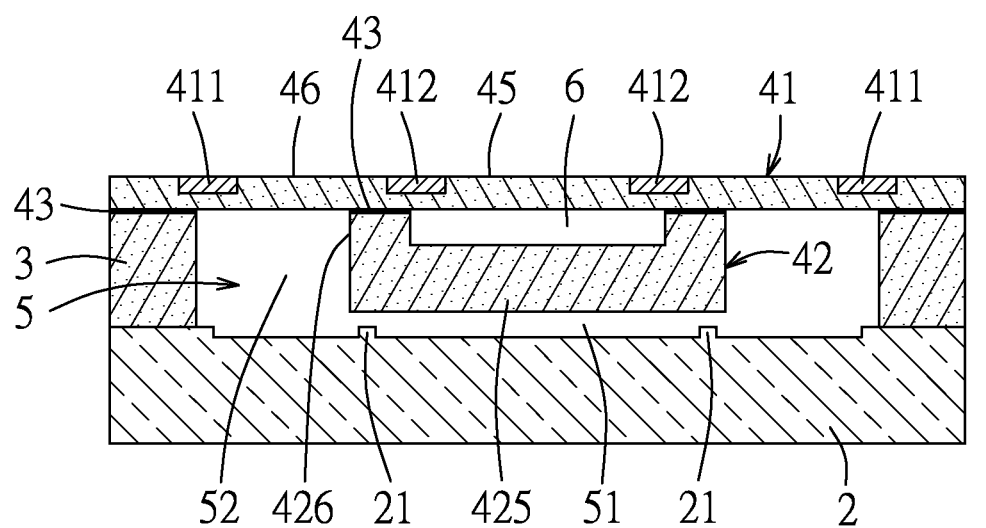
FIG. 2 is a sectional view of the first embodiment taken along line II-II of FIG. 1.

FIGS. 1 and 2 illustrate the first embodiment of a diaphragm piezoresistive pressure sensor according to the present invention.

The diaphragm piezoresistive pressure sensor includes: a non-flexible base member 2; a flexible diaphragm 41 overlapping and spaced apart from the base member 2 along a normal direction (Y) relative to the diaphragm 4, the diaphragm 41 being deformable toward the base member 2 and including a middle portion 45 and a surrounding portion 46 surrounding the middle portion 45; an outer spacer 3 disposed between and cooperating with the base member 2 and the diaphragm 41 to define a cavity 5 thereamong, the diaphragm 41 overlapping an entire area of the cavity 5 along the normal direction (Y); an inner abutment member 42 disposed in the cavity 5 and spaced apart from the base member 2 along the normal direction (Y) by a clearance 51, the inner abutment member 42 being secured to the diaphragm 41 so as to be movable with the diaphragm 41 toward the base member 2; and a piezoresistive sensor unit that includes at least one first piezoresistor 411 embedded in the surrounding portion 46 of the diaphragm 41 and at least one second piezoresistor 412 embedded in the middle portion 45 of the diaphragm 41. The outer spacer 3 surrounds and is spaced apart from the inner abutment member 42 along a transverse direction (X) relative to the normal direction (Y) by a gap 52, and has a thickness along the normal direction (Y) much greater than that of the diaphragm 41 so that the outer spacer 3 is substantially non-flexible and non-deformable. The gap 52 is in fluid communication with the clearance 51. The surrounding portion 46 of the diaphragm 41 overlaps an entire area of the gap 52 along the normal direction (Y), and is suspended over the gap 52. At least one of the inner abutment member 42 and the middle portion 45 of the diaphragm 41 defines a chamber 6 therebetween. The clearance 51 overlaps an entire area of the chamber 6 along the normal direction (Y). The middle portion 45 of the diaphragm 41 overlaps an entire area of the chamber 6 along the normal direction (Y), and is suspended over the chamber 6. The middle portion 45 and the surrounding portion 46 of the diaphragm 41 have a uniform thickness. The piezoresistive sensor unit is configured to measure pressures at least in two different pressure ranges corresponding to the cavity 5 and the chamber 6, respectively. Alternatively, in one embodiment, the diaphragm piezoresistive pressure sensor may be formed with a plurality of independent chambers (not shown) that are separated from one another and that correspond to different portions (not shown) of the diaphragm 41, and the piezoresistive sensor unit may be configured to measure pressures of the cavity and the chambers, which fall in different pressure ranges, respectively.

In this embodiment, the inner abutment member 42 has a lower wall 425 and a surrounding wall 426 that cooperates with the lower wall 425 to define the chamber 6. The lower wall 425 is disposed adjacent to the base member 2, and is aligned with and is spaced apart from the middle portion 45 of the diaphragm 41 along the normal direction (Y) by the chamber 6. The surrounding wall 426 extends from a periphery of the lower wall 425 toward the diaphragm 41 in the normal direction (Y), and is bonded to the diaphragm 41 through an adhesive 43. The inner abutment member 42 may be made of a material, such as silicon, and has a thickness much greater than that of the diaphragm 41 so that the inner abutment member 42 is substantially non-flexible and non-deformable.

The base member 2 is formed with a plurality of contacting protrusions 21 that protrude therefrom into the clearance 51 for abutting against the lower wall 425 when the diaphragm 41 is deformed toward the base member 2. Alternatively, the contacting protrusions 21 may be formed on a bottom of the lower wall 425.

In this embodiment, the base member 2 is in the form of a rigid plate of a material, such as glass, and the outer spacer 3 is in the form of a hollow block of a material, such as silicon. The hollow block is bonded to and extends from a periphery of the rigid plate toward the diaphragm 41 and is securely bonded to the diaphragm 41 through the adhesive 43.

In this embodiment, the piezoresistive sensor unit includes a plurality of the first piezoresistors 411 and a plurality of the second piezoresistors 412, and the diaphragm 41 is made from a material, such as silicon, and has regions that are doped with a dopant so as to define the first and second piezoresistors 411, 412, respectively. The dopant may be p-type or n-type dopant. The first piezoresistors 411 are electrically connected through a first conductor line set 71 to form a first Wheatstone bridge, and the second piezoresistors 412 are electrically connected through a second conductor line set 72 to form a second Wheatstone bridge that is surrounded by the first Wheatstone bridge.

The pressure of the cavity 5 and the pressure of the chamber 6 may be adjusted to predetermined values according to actual requirements, may be different or the same, and may be equal to, less or greater than one atmosphere.

The inclusion of the inner abutment member 42 in the diaphragm piezoresistive pressure sensor of the present invention permits the first and second Wheatstone bridges to measure low and high pressure ranges of a pressure source (not shown) to which the entire diaphragm piezoresistive pressure sensor is exposed.

Figure 3:
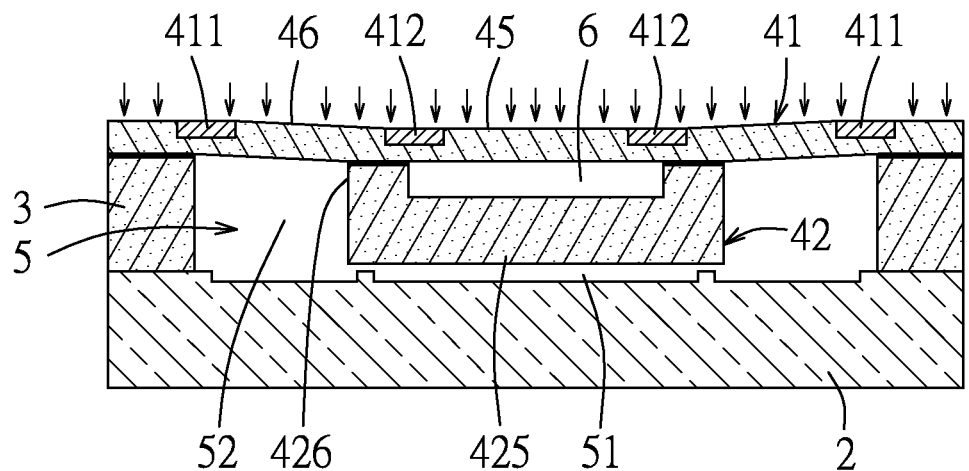
FIG. 3 is a sectional view of the first embodiment illustrating a state in which the first embodiment is exposed to a low pressure.
Figure 4:
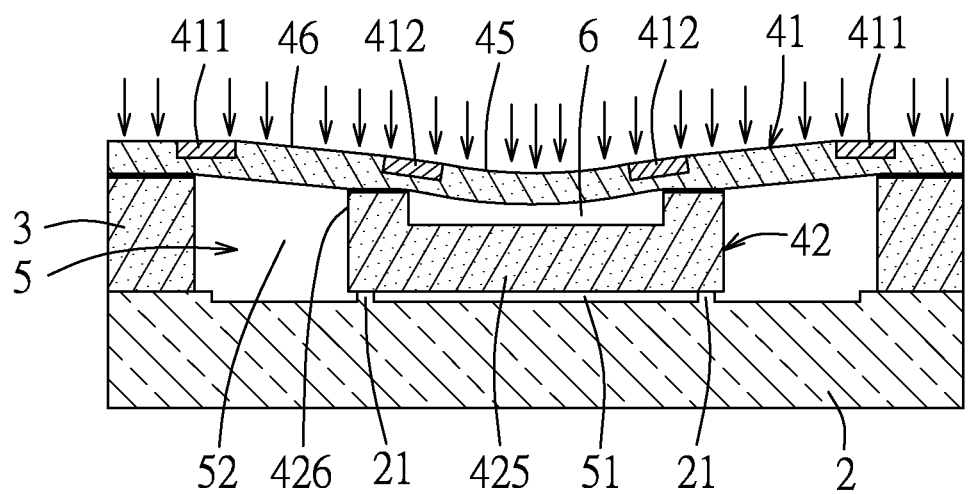
FIG. 4 is a sectional view of the first embodiment illustrating another state in which the first embodiment is exposed to a high pressure.

FIG. 3 shows the results of deflection for both the surrounding portion 46 and the middle portion 45 of the diaphragm 41 when the pressure source has a pressure within the low pressure range. The results show that apparent deflection toward the base member 2 occurs at the surrounding portion 46 and the amount of deflection thereof increases with the pressure of the pressure source, while deflection of the middle portion 45 toward the lower wall 425 is extremely small. The amount of deflection of the surrounding portion 46 reaches a maximum value with the inner abutment member 42 touching the contacting protrusions 21 when the pressure of the pressure source reaches a pressure threshold point. As shown in FIG. 4, when exposed to the high pressure range which is greater than the pressure threshold point, deflection of the surrounding portion 46 is extremely small, while the amount of deflection of the middle portion 45 increases with the pressure of the pressure source. It is noted that the contacting protrusions 21 facilitate separation of the inner abutment member 42 from the base member 2 when the pressure of the pressure source is decreased to a value less than the pressure threshold point.

Figure 5:
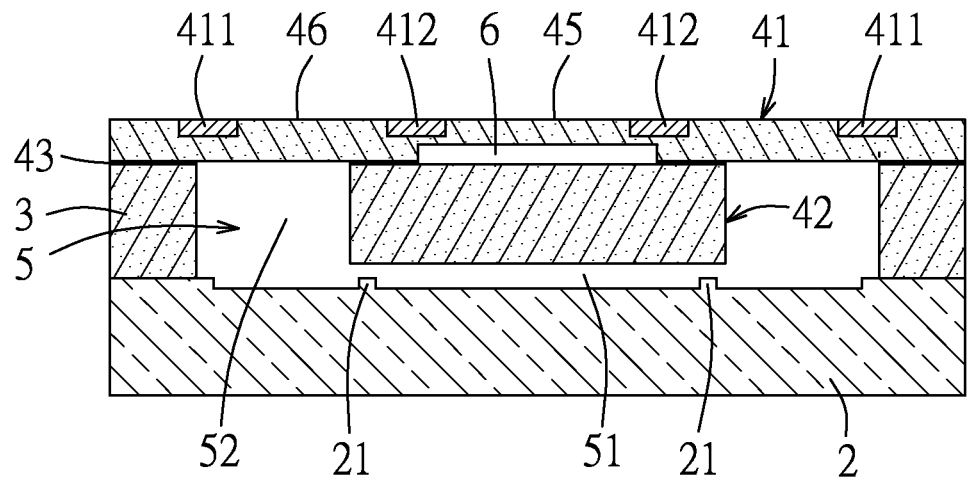
FIG. 5 is a sectional view of the second embodiment of the diaphragm piezoresistive pressure sensor according to the present invention.

FIG. 5 illustrates the second embodiment of the diaphragm piezoresistive pressure sensor according to the present invention. The second embodiment differs from the previous embodiment in that the middle portion 45 of the diaphragm 41 is recessed to form the chamber 6. In this embodiment, the inner abutment member 42 is in the form of a flat plate that is bonded to a periphery of the chamber 6 to close the chamber 6, and is spaced apart from the base member 2 by the clearance 51.

Figure 6:
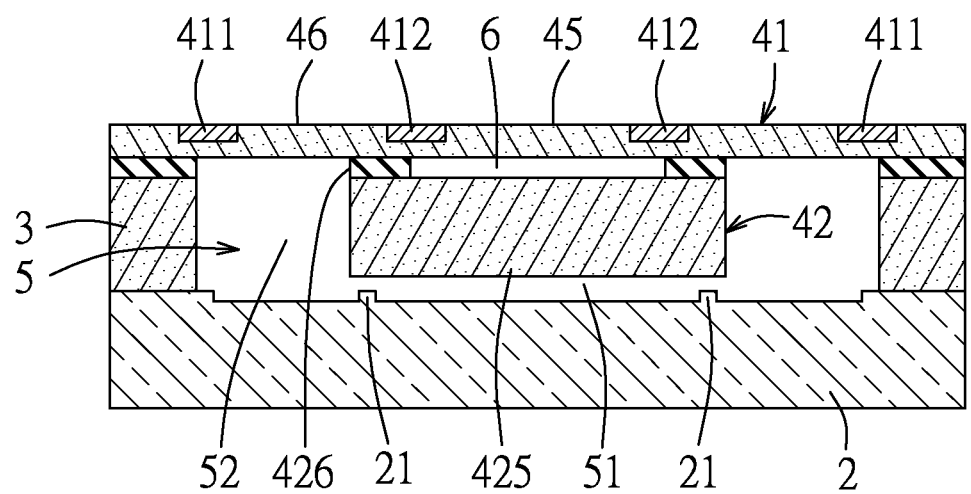
FIG. 6 is a sectional view of the third embodiment of the diaphragm piezoresistive pressure sensor according to the present invention.

FIG. 6 illustrates the third embodiment of the diaphragm piezoresistive pressure sensor according to the present invention. The third embodiment differs from the first embodiment in that the inner abutment member 42 has a lower wall 425 of a silicon flat plate and a surrounding wall 426 of an adhesive material that cooperates with the lower wall 425 to define the chamber 6. The lower wall 425 is disposed adjacent to the base member 2, and is aligned with and is spaced apart from the middle portion 45 of the diaphragm 41 along the normal direction (Y) by the chamber 6. The surrounding wall 426 extends from a periphery of the lower wall 425 toward the diaphragm 41, and is adhesively bonded to the diaphragm 41 and the lower wall 425.

Figure 7:
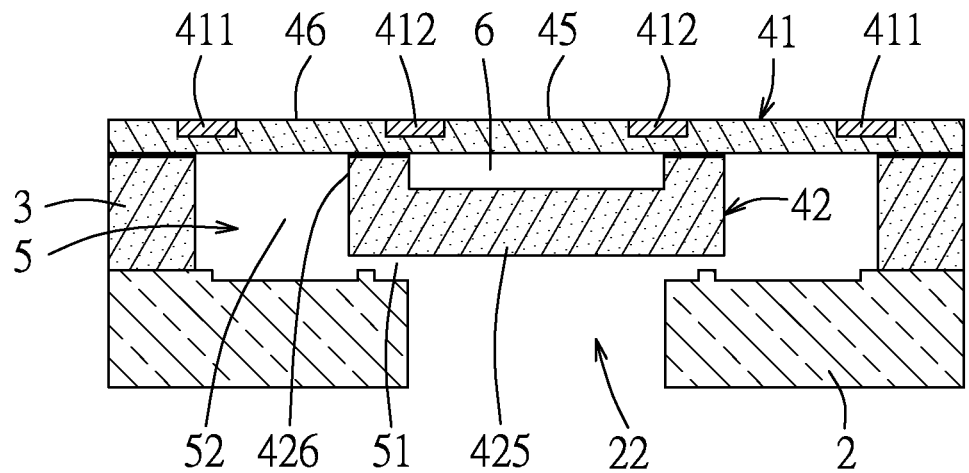
FIG. 7 is a sectional view of the fourth embodiment of the diaphragm piezoresistive pressure sensor according to the present invention.

FIG. 7 illustrates the fourth embodiment of the diaphragm piezoresistive pressure sensor according to the present invention. The fourth embodiment differs from the first embodiment in that the base member 2 is formed with a through-hole 22 that is in fluid communication with the clearance 51. As such, the fourth embodiment may be used in a system that has two different pressure sources. For example, the diaphragm 41 may be exposed to a first pressure of a first pressure source (not shown), while the gap 52 may be exposed to a second pressure of a second pressure source (not shown) by connecting the base member 2 to the second pressure source. In this embodiment, the chamber 6 is sealed and the pressure thereof is predetermined, while the pressure of the second pressure source may be adjusted according to actual requirements. Hence, the first piezoresistors 411 of this embodiment may be used to measure the differential pressure between the gap 52 and the first pressure source, while the second piezoresistors 412 of this embodiment may be used to measure the differential pressure between the chamber 6 and the first pressure source.

Figure 8:
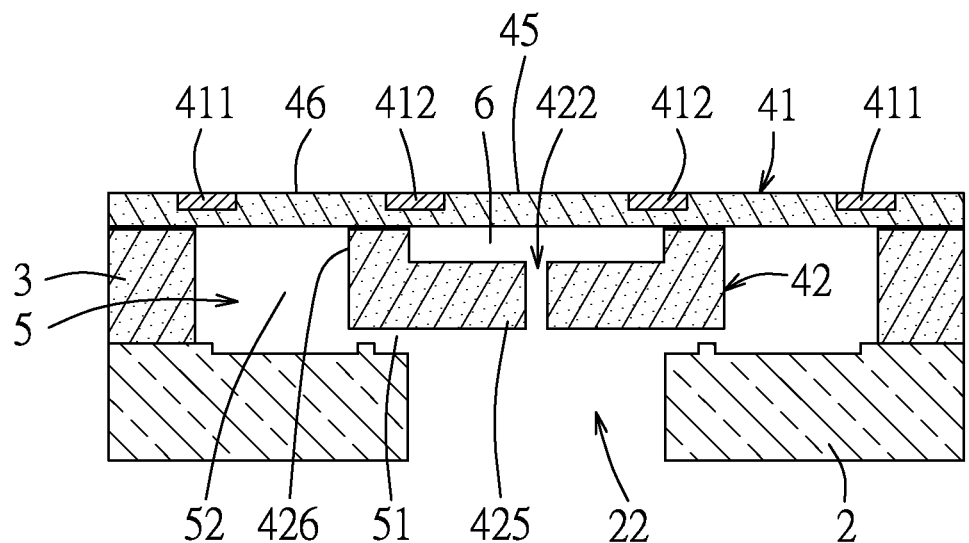
FIG. 8 is a sectional view of the fifth embodiment of the diaphragm piezoresistive pressure sensor according to the present invention.

FIG. 8 illustrates the fifth embodiment of the diaphragm piezoresistive pressure sensor according to the present invention. The fifth embodiment differs from the fourth embodiment in that the lower wall 425 of the inner abutment member 42 is formed with a through-hole 422 that is in fluid communication with the clearance 51. Hence, in this embodiment, the differential pressure between the gap 52 and the first pressure source is the same as the differential pressure between the chamber 6 and the first pressure source.

Figure 9:
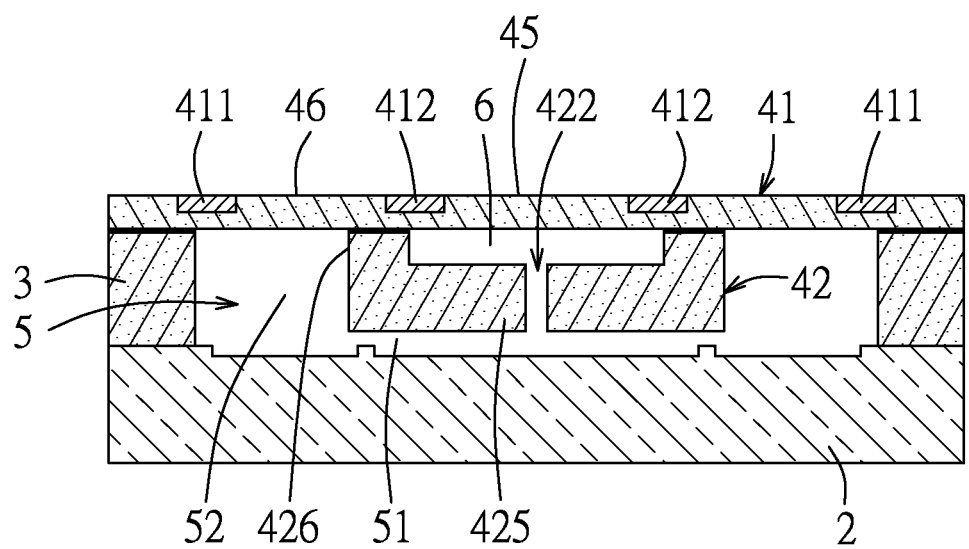
FIG. 9 is a sectional view of the sixth embodiment of the diaphragm piezoresistive pressure sensor according to the present invention.

FIG. 9 illustrates the sixth embodiment of the diaphragm piezoresistive pressure sensor according to the present invention. The sixth embodiment differs from the first embodiment in that the lower wall 425 of the inner abutment member 42 is formed with a through-hole 422 that is in fluid communication with the clearance 51. In this embodiment, the accommodating space 5 or the gap 52 is sealed and the differential pressure between the gap 52 and the pressure source is the same as the differential pressure between the chamber 6 and the pressure source.

Figure 10:
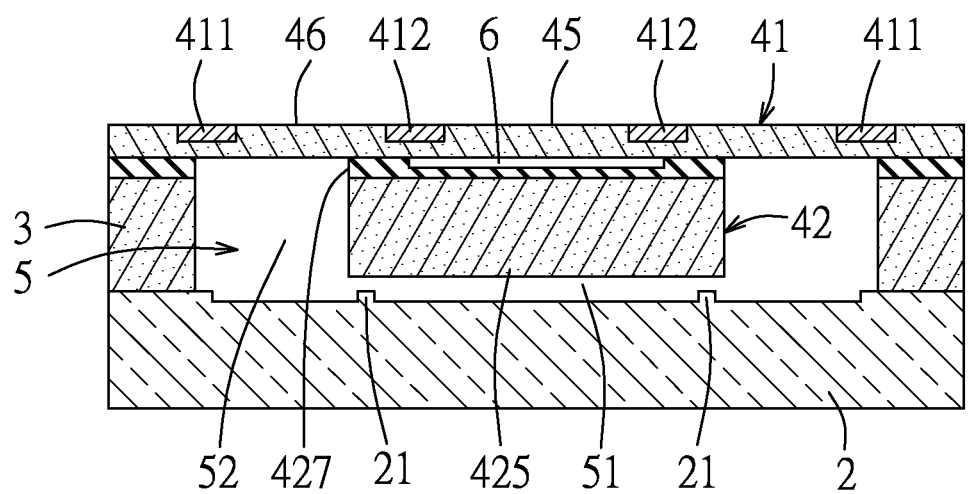
FIG. 10 is a sectional view of the seventh embodiment of the diaphragm piezoresistive pressure sensor according to the present invention.

FIG. 10 illustrates the seventh embodiment of the diaphragm piezoresistive pressure sensor according to the present invention. The seventh embodiment differs from the first embodiment in that the inner abutment member 42 has a lower plate 425 and an adhesive layer 427 of an adhesive material. The lower plate 425 is disposed adjacent to the base member 2, is aligned with the middle portion 45 of the diaphragm 41 along the normal direction (Y) by the chamber 6, and is bonded to the diaphragm 41 through the adhesive layer 427. The chamber 6 is formed in the adhesive layer 427.

With the inclusion of the inner abutment member 42 in the diaphragm piezoresistive pressure sensor of the present invention, the diaphragm piezoresistive pressure sensor may be useful to measure absolute or relative pressure of a pressure source or the absolute or relative pressures of different pressure sources at low and high pressure ranges, and miniaturization of the diaphragm piezoresistive pressure sensor for measuring multi-pressure ranges may be facilitated.

While the present invention has been described in connection with what are considered the most practical embodiments, it is understood that this invention is not limited to the disclosed embodiments but is intended to cover various arrangements included within the spirit and scope of the broadest interpretation and equivalent arrangements.

What is claimed is:

1. A diaphragm piezoresistive pressure sensor comprising:
   a base member;
   a diaphragm overlapping and spaced apart from said base member along a normal direction relative to said diaphragm, said diaphragm being deformable toward said base member and including a middle portion and a surrounding portion surrounding said middle portion;
   a spacer disposed between and cooperating with said base member and said diaphragm to define a cavity thereamong, said diaphragm overlapping an entire area of said cavity along the normal direction;
   an inner abutment member disposed in said cavity and spaced apart from said base member along the normal direction by a clearance, said inner abutment member being secured to said diaphragm so as to be movable with said diaphragm relative to said base member; and
   a piezoresistive sensor unit embedded in said surrounding portion and said middle portion of said diaphragm;
   wherein said spacer surrounds and is spaced apart from said inner abutment member;
   wherein said inner abutment member and said middle portion of said diaphragm define a chamber therebetween; and
   wherein said piezoresistive sensor unit is configured to measure pressures at least in two different pressure ranges corresponding to said cavity and said chamber, respectively.

2. The diaphragm piezoresistive pressure sensor of claim 1, wherein said middle portion of said diaphragm is suspended over said chamber.

3. The diaphragm piezoresistive pressure sensor of claim 1, wherein said spacer is spaced apart from said inner abutment member along a transverse direction relative to the normal direction by a gap, said gap being in fluid communication with said clearance, said surrounding portion of said diaphragm being suspended over said gap.

4. The diaphragm piezoresistive pressure sensor of claim 1, wherein said base member is formed with a plurality of contacting protrusions that protrude therefrom into said clearance and wherein a bottom surface of said inner abutment member contacts said plurality of contacting protrusions at a deformed state of said diaphragm.

5. The diaphragm piezoresistive pressure sensor of claim 1, wherein said chamber is formed by having a recess in said inner abutment member.

6. The diaphragm piezoresistive pressure sensor of claim 1, wherein said chamber is formed by having a recess in said middle portion of said diaphragm.

7. The diaphragm piezoresistive pressure sensor of claim 1, wherein said inner abutment member includes an adhesive layer and a lower plate that is bonded to said diaphragm through said adhesive layer, said chamber being formed by having a recess in said adhesive layer.

8. The diaphragm piezoresistive pressure sensor of claim 1, wherein said base member is formed with a through-hole that is in fluid communication with said cavity.

9. The diaphragm piezoresistive pressure sensor of claim 8, wherein said inner abutment member is formed with another through-hole that is in fluid communication with said cavity and said chamber.

10. The diaphragm piezoresistive pressure sensor of claim 1, wherein said inner abutment member is formed with a through-hole that is in fluid communication with said cavity and said chamber.

11. The diaphragm piezoresistive pressure sensor of claim 1, wherein said piezoresistive sensor unit includes a plurality of first piezoresistors embedded in said surrounding portion of said diaphragm, and a plurality of second piezoresistors embedded in said middle portion of said diaphragm.

12. The diaphragm piezoresistive pressure sensor of claim 11, wherein said diaphragm is made from silicon and has regions that are doped with a dopant, said regions defining said plurality of first piezoresistors and said plurality of second piezoresistors, respectively.

13. The diaphragm piezoresistive pressure sensor of claim 1, wherein said middle portion and said surrounding portion of said diaphragm have a uniform thickness.

14. The diaphragm piezoresistive pressure sensor of claim 1, wherein the normal direction is perpendicular to a top surface of said diaphragm at an undeformed state of said diaphragm.

15. The diaphragm piezoresistive pressure sensor of claim 1, wherein a thickness of said inner abutment member is larger than a thickness of said diaphragm.

16. The diaphragm piezoresistive pressure sensor of claim 1, wherein a thickness of said middle portion of said diaphragm is thinner than a thickness of said surrounding portion of said diaphragm.

* * * * *